United States Patent

Nash

Patent Number: 5,450,932
Date of Patent: Sep. 19, 1995

[54] DASHPOTS

[75] Inventor: Richard C. Nash, Guildford, England

[73] Assignee: Kinetrol Limited, Farnham, England

[21] Appl. No.: 245,677

[22] Filed: May 18, 1994

[30] Foreign Application Priority Data

May 27, 1993 [GB] United Kingdom ............... 9310967

[51] Int. Cl.6 .................................................. F16F 9/04
[52] U.S. Cl. ...................................... 188/298; 188/310
[58] Field of Search ............... 188/293, 294, 296, 307, 188/310, 322.5, 298; 16/51, 52, 82; 267/117, 222

[56] References Cited

U.S. PATENT DOCUMENTS

| | | | |
|---|---|---|---|
| 933,076 | 9/1909 | Houdaille | 188/310 |
| 2,016,591 | 10/1935 | Chapin | 188/310 |
| 2,991,992 | 7/1961 | Elsner | 188/298 X |
| 2,997,140 | 8/1961 | Rumsoy et al. | 188/309 X |
| 3,620,523 | 11/1971 | Benjamin | 188/298 X |
| 3,891,199 | 6/1975 | Willich et al. | 188/298 X |
| 4,768,630 | 9/1988 | Aubry et al. | |

FOREIGN PATENT DOCUMENTS 481569  3/1938  United Kingdom .
701310  12/1953  United Kingdom .
1566699  5/1980  United Kingdom .

*Primary Examiner*—Matthew C. Graham
*Assistant Examiner*—Lee W. Young
*Attorney, Agent, or Firm*—Hopgood, Calimafde, Kalil & Judlowe

[57] ABSTRACT

A liquid dashpot has a casing comprising a main body and bottom cover. The main body contains a liquid chamber which is divided into two discrete spaces by a vane member. One end wall of the chamber has porting passage means formed between the outer face of said wall and the bottom cover to provide restricted communication between the chamber spaces. A flexible diaphragm forms a compensation chamber on the bottom cover subject to atmospheric pressure. The chamber can communicate with the spaces within the liquid chamber through non-return means that block superatmospheric flow to the compensating chamber. The porting and the communicating passage means between the spaces and the compensating chamber are formed integrally in the die-cast main body and/or the bottom cover, requiring no machining. Assembly is facilitated by bringing together the bottom cover, flexible diaphragm and non-return means as a sub-assembly.

12 Claims, 2 Drawing Sheets

DASHPOTS

BACKGROUND OF THE INVENTION

This invention relates to dashpots or dampers in which the damping action is provided by the displacement of liquid in a liquid-filled chamber.

The dashpot may for example be a semi-rotary type, in which at least one vane in the chamber is pivotable relative to the chamber to displace the liquid, or a linear type in which the chamber is cylindrical and a piston is relatively axially displaceable within it.

In British Patent No. 1566699, it is explained how the application of torque to a semi-rotary dashpot incorporating a vaned rotor produces a rise of fluid pressure in the space on one side of the vane and a decrease in pressure on the other side and how this can lead to an excessive pressure reduction in part of the liquid which causes voids to appear in the liquid, leading to problems from the degassing of the liquid.

That earlier patent describes an arrangement for limiting the pressure drop by providing communication through the rotor to an inner space surrounding a shaft on which the rotor pivots. In that space a compensation chamber sealed from the exterior by a flexible diaphragm connected between the casing and the rotor, the diaphragm forming a boundary subject to atmospheric pressure. Because the diaphragm is able to flex under atmospheric pressure, additional fluid is able to flow into the dashpot chamber to limit a sub-atmospheric pressure drop on either side of the vane, so avoiding the problems explained.

The arrangement disclosed in that earlier patent is rather complex and presents assembly difficulties, both of which factors increase the production costs. It is possible by use of the present invention to provide a simpler solution to the problem.

SUMMARY OF THE INVENTION

According to one aspect of the present invention, in a dashpot comprising a casing forming a liquid chamber which is divided by a relatively displaceable member comprising a piston or vane, a flexible boundary member being sealed to the casing to form therewith a compensation chamber subject on its exterior to atmospheric pressure, and communication means being provided in the casing between said compensation chamber and the respective spaces in the liquid chamber, there also being closure valve means between the compensation chamber and each said space to block flow from said compensation chamber to a respective space when the pressure in that space exceeds atmospheric.

The flexible boundary member can thus be mounted entirely on the static casing and the casing can similarly contain the communication means to the spaces at opposite sides of the dividing member. In addition, this arrangement can incorporate variable restriction means for the flow through the communication means to allow the damping rate to be varied.

According to another aspect of the invention, for the production of semi-rotary or linear dashpots in a relatively simple and cost-effective manner, there is provided a dashpot comprising a casing having a main body and an outer member, the main body forming a liquid chamber which is divided into two discrete spaces by a relatively displaceable member comprising a piston or vane, said chamber having bounding wall provided with porting which opens into the respective spaces, the outer member abutting an exterior face of said wall and forming therewith passage means communicating between the porting for a restricted flow between said spaces damping the relative displacement between the piston or vane and the casing.

For ease of manufacture, the main body and/or the outer member can be produced by casting, e.g. pressure die casting, with integral channels for said passage means and said porting formed integrally in the casting process.

In a preferred form of the invention, the casing of the dashpot is provided with both the aforesaid passage means and said compensation chamber. Thus, the outer member of the casing which forms the passage means by the abutment with an exterior face of the body can have the flexible boundary member attached to it to provide the compensation chamber.

The invention will be further described by way of example with reference to the embodiment in the accompanying drawings.

DESCRIPTION OF THE PREFERRED EMBODIMENT

Figure 1:
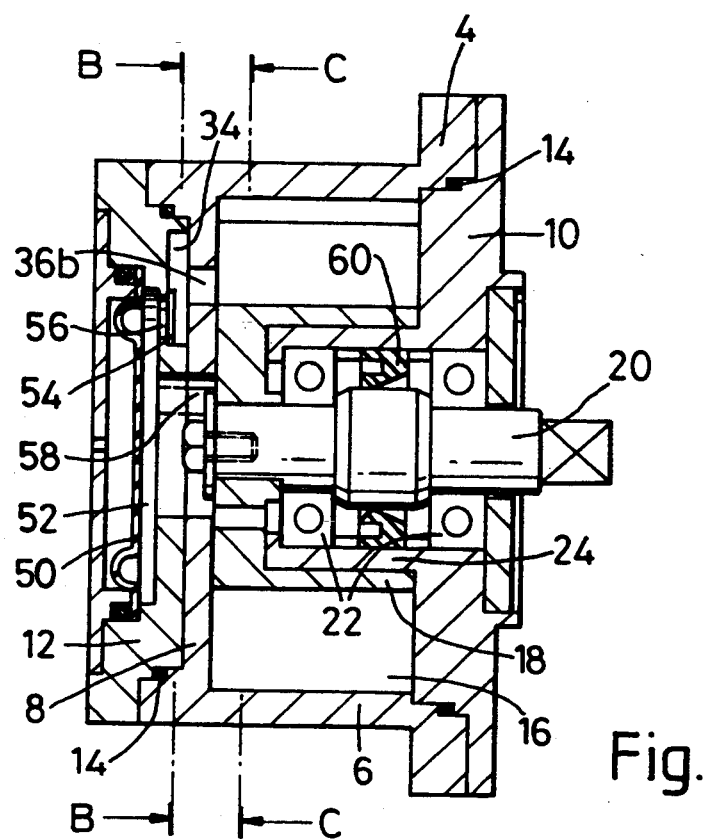
FIG. 1 is an axial sectional view of a semi-rotary dashpot according to the invention on the line A—A in FIG. 3, FIGS. 2 and 3 are radial sections on the line B—B and C—C respectively in FIG. 1.
Figure 2:
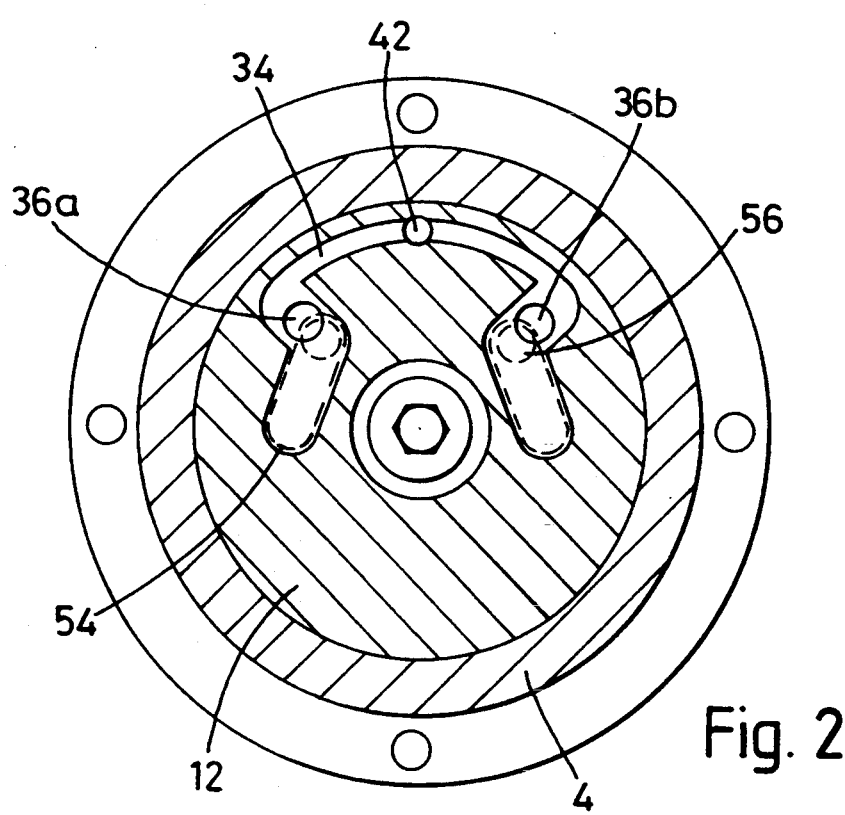
Figure 3:
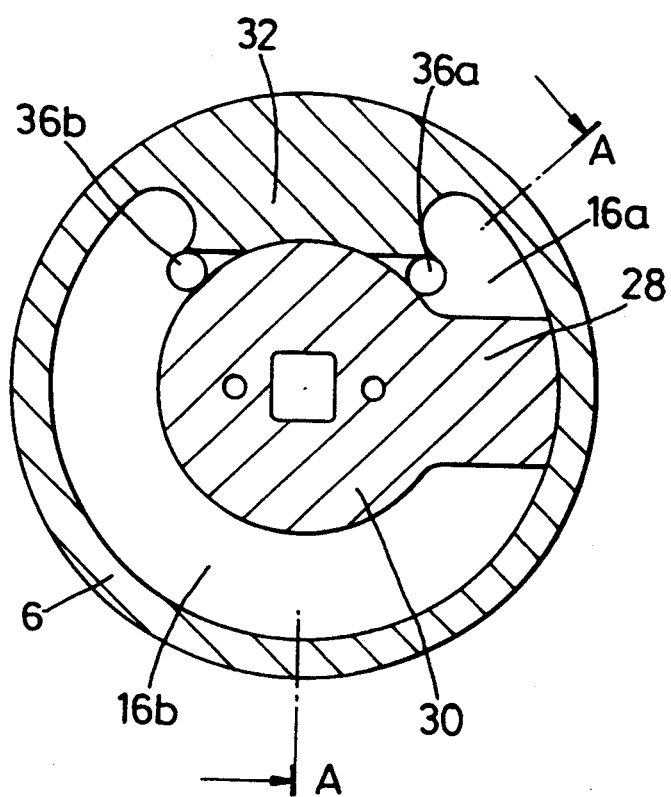
Figure 4:
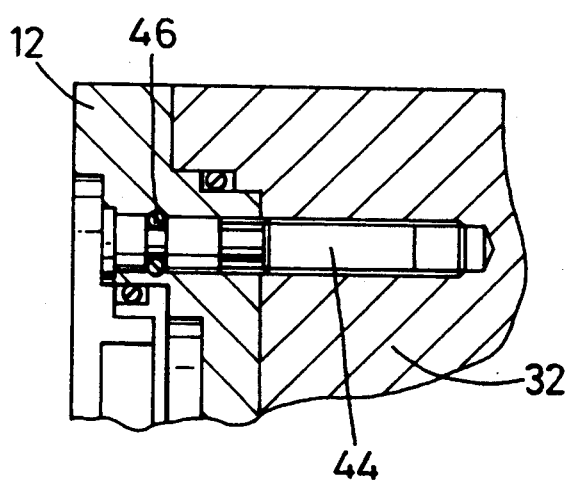
FIG. 4 is a detail sectional view of the damping adjuster of the dashpot of FIGS. 1 to 3.

The illustrated dashpot has a casing comprising a main body 4 having generally cylindrical peripheral wall 6 and integral lower end wall 8. Top and bottom covers 10,12 are secured to opposite ends of the body with sealing O-rings 14 interposed. The body 4 and top cover 10 enclose a fluid chamber 16 in which a rotor 18 of the dashpot is installed. The rotor is carried on a rotary shaft 20 mounted in bearings 22 in a collar 24 of the top cover 10. The rotor comprises a single radial vane 28 and a boss 30 fitting closely to a barrier 32 integral with the body 4 and projecting inwards from cylindrical wall of the body. The barrier and the rotor divide the chamber 16 into two discrete spaces 16a,16b which are substantially sealed from each other, although to minimize friction there is no contact between the rotor and the body or top cover. The single-vaned rotor can turn through an angle of about 270°, the end limits being set by the barrier 32.

The bottom cover 12 abuts against the body end wall 8 and a channel integrally formed in the abutting face of the bottom cover forms a closed passage 34 with the opposed face of the body end wall 8. The passage 34 extends between ports 36a,36b opening into the chamber at each side of the barrier 32. Midway between the ports the passage is interrupted by a cross bore 42 through which an adjustment valve 44 projects to restrict the flow through the passage. The valve is screw-threaded into the body of the barrier 32 and carries an O-ring 46 which seals with the bore in the bottom cover 12 through which it passes. As the valve is screwed in and out, a reduced cross-section portion moves in relation to the passage 34 to vary the restriction of fluid flow through the passage.

A flexible diaphragm 50 is sealingly secured in the bottom cover 12 to the exterior of the passage 34. It encloses one end of a compensation chamber 52 sealed from the passage by respective non-return valves 54 closing ports 56 near the opposite ends of the passage 34. The compensation chamber 52 is also shielded from the casing chamber by the close-fitting of the hub of the rotor 18 to the end wall 8 of the casing. A central aperture 58 in that end wall continues the compensation chamber along the clearance between the rotor shaft and the collar 24 of the top cover as far as a sliding seal 60.

When in use, as the rotor 18 is driven by a torque applied between the casing and the shaft 20, and that one of the two spaces 16a,16b which is reducing in volume because of the rotary movement experiences an increase of pressure. Fluid is thereby forced through the passage 34 to the opposite space at a rate controlled by the setting of the adjustment valve. In dependence on the setting of the valve 44 the resistance to the flow damps the relative rotary motion.

The restriction of the fluid flow to the expanding space by the valve 44 tends to lower the fluid pressure there. When the pressure is sub-atmospheric the compensation chamber comes into operation to limit the pressure drop. The valves 54 that normally seal the compensation chamber 52 from the passage 34 comprise spring plates which are flexed away from the ports when the pressure in their adjoining region of the passage falls below the compensating chamber pressure. The fluid in the compensation chamber is maintained substantially at atmospheric pressure by virtue of the diaphragm 50, so that a drop in the pressure in either of the chamber spaces 16a,16b below atmospheric draws fluid into that space by opening the associated port 56. In this way the pressure drop can be limited to prevent voids forming in either space of the chamber.

Any tendency of fluid to accumulate in the dashpot chamber 16 after being drawn from the compensating chamber 52 is prevented by leakage of fluid back to the compensating chamber past the opposed faces of the rotor hub 30 and the lower end wall 8. It is arranged that these parts fit sufficiently closely, however, so that the rate of leakage is too slow to affect the damping characteristics.

Although in practice it is found that sliding seals for rotary shafts often are unable to prevent leakage, in the present case, because the fluid in the compensating chamber is maintained very close to atmospheric pressure, the risk of fluid leakage past the sliding seal 60 is minimized, even after prolonged use.

It may be noted that the construction described is relatively simple both in form and in the manner in which it can be assembled. The casing body 4 and top and bottom covers 10,12 can be produced as die-cast parts requiring no machining. There is direct access to both sides of the bottom cover 12 for assembly of the spring plate valves 54 and the diaphragm 50 before the cover is secured to the casing, and the rotor shaft 20 with its bearings 22 and sliding seal 60 can be produced as a sub-assembly before being inserted in the top cover 10 and this secured to the casing body 4.

I claim:

1. A dashpot comprising:
   a casing,
   a liquid chamber formed in said casing,
   a divider member comprising a piston or vane in said chamber dividing the chamber into two discrete spaces,
   said divider member and chamber being displaceable relative to each other,
   sliding seal means between said casing and said divider member for sealing the liquid in the liquid chamber and permitting said relative displacement,
   a flexible boundary member sealed to the casing and having an exterior face subject to atmospheric pressure,
   a compensation chamber formed by said casing and by said flexible boundary member being thereby subject also to atmospheric pressure,
   said sliding seal means having inner and outer faces,
   the inner face being in communication with the compensation chamber for maintaining the pressure on said inner face substantially at atmospheric pressure, and said outer face being exposed to atmospheric pressure,
   communication means in the casing between said compensation chamber and the respective spaces in the liquid chamber, and
   closure valve means between the compensation chamber and each said space for blocking flow from the compensation chamber through said communication means to a respective space when the pressure in that space exceeds atmospheric.

2. A dashpot according to claim 1 wherein the flexible boundary member is mounted on the casing and passage means are provided in the casing for restricted communication between said liquid chamber spaces for damping said divider relative displacement between said liquid chamber and said divider member.

3. A dashpot according to claim 1 having a leakage path between said liquid chamber spaces and said compensating chamber for reducing a sustained super-atmospheric pressure in either of said spaces of the liquid chamber.

4. A dashpot according to claim 1 wherein said casing comprises a hollow main body in which said chamber is located, said chamber having a bounding wall and the casing further comprising an outer member engaging an exterior face of said wall, said flexible boundary member being sealed to said outer member and said communication means comprising passage means in said bounding wall.

5. A dashpot according to claim 4 wherein said means blocking flow between the compensating chamber and the spaces of the liquid chamber are mounted on the casing outer member, and said blocking-flow means and said flexible boundary member are secured to said outer member before the assembly of said outer member and said main body to form the casing.

6. A rotary-displacement dashpot having a casing comprising a main body within which a liquid chamber is defined between a lower body cover and a top body cover, said casing providing journalled support for a rotor on a central axis through said chamber, said rotor having a cylindrical formation with a single radially outward vane and said body having a cylindrical peripheral chamber wall with a single radially inward barrier in substantially sealed running-clearance relation to the cylindrical formation of said rotor, the vane of said rotor being in substantially sealed running-clearance relation to said peripheral wall and dividing the chamber into two substantially sealed chamber spaces the volumes of which change in a complementary manner when the rotor and its vane are displaced about the rotor axis; a sliding seal between said top cover and a cylindrical portion of said rotor, said lower cover having a central opening closed at one end by said cylindrical portion, and a flexible diaphragm with external atmospheric exposure and sealed to said lower cover to define at the opposite end of said central opening an atmospheric compensation chamber for liquid in said chamber spaces; first and second passages communicating between said atmospheric-compensation chamber and the respective chamber spaces divided by said vane, there being a separate non-return valve in each of said first and second passages, each of said non-return valves being oriented to block flow of super-atmospheric liquid from its associated chamber space while allowing flow from the atmospheric-compensation chamber when liquid pressure in its associated chamber space falls below atmospheric pressure; said sliding seal having external atmospheric exposure on one side, and the other side of said sliding seal having direct internal-passage communication with said atmospheric-compensation chamber.

7. A dashpot comprising a casing having a main body, a liquid chamber in said casing, a divider member comprising a piston or vane in said chamber dividing the chamber into two discrete spaces, said divider member and said casing being displaceable relative to each other to vary the volumes of said spaces, said chamber having a bounding wall, porting in said bounding wall between an exterior face of said wall and the respective said spaces, said casing further comprising an outer member abutting said exterior face of said wall, passage means being formed by said abutment of the outer member and said exterior wall, said passage means communicating between the porting and providing means for a restricted flow between said spaces for damping said relative displacement between the divider member and the casing.

8. A dashpot according to claim 7 wherein at least one of said main body and outer member is formed integrally with channels for said passage means.

9. A dashpot according to claim 7 further comprising a flexible boundary member sealed to the casing and having an outer face exposed to atmospheric pressure, a compensation chamber being formed by said boundary member and casing, means for communication between said compensating chamber and the spaces in the liquid chamber on opposite sides of said divider member, and closure valve means for blocking flow through said communication means from said compensating chamber to a respective space of the liquid chamber when the pressure in said respective space exceeds atmospheric.

10. A dashpot according to claim 9 wherein the flexible boundary member is secured to said outer member of the casing.

11. A dashpot according to claim 7 wherein at least one of said casing main body and said outer member are formed as unmachined die-cast parts.

12. A dashpot according to claim 7 wherein variable restriction means are provided for the flow through said passage means to allow the damping rate of the dashpot to be varied.

* * * * *